United States Patent Office 2,839,445
Patented June 17, 1958

2,839,445

FUNGICIDAL AND ANTI-OXIDANT COMPOSITIONS COMPRISING 1,3-DITHIOLANES

John F. Harris, Jr., Dunlinden Acres, Del., assignor to E. I. du Pont de Nemours and Company, Wilmington, Del., a corporation of Delaware No Drawing. Application January 11, 1954
Serial No. 403,447

17 Claims. (Cl. 167—33)

This invention is concerned with organic compounds of sulfur and, more particularly, with substituted 1,3-dithiolanes.

Most biologically active compounds are very complex chemical materials. Perhaps because of their complexity most of these biologically active materials are of limited availability. Also many of them have undesirable effects in addition to their helpful properties and it may be postulated that this too is related to their chemical complexity, one property or function being associated with one portion of the molecule and another property being associated with a different portion of the molecule. Because of this there is great interest in a search for simple, easily made, biologically active compounds.

This invention has as an object a new class of biologically active compounds of relatively simple chemical structure which can be readily synthesized from available organic chemicals. A further object is the preparation of a new class of stabilizers and preservatives for glyceride fats and oils subject to rancidification. A still further object is the preparation of a new class of fungicides. Other objects will appear hereinafter.

These objects are accomplished by the preparation of the new class of 1,3-dithiolanes and substituted 1,3-dithiolanes having at position 2 or 4 a carboxylic acid side chain in which the carboxyl group is separated from the ring by a saturated aliphatic hydrocarbon chain having at least one carbon atom, i. e., of carboxydithiolanes having the carbonyl group joined by a saturated aliphatic hydrocarbon chain of at least one extranuclear carbon to carbon of the dithiolane nucleus. The carboxydithiolanes of the present invention can be prepared by the reaction of the corresponding vicinal dithiols with aldehydo- and keto-acids in which the carboxyl group of the aldehyde or ketone is separated from the carboxyl group of the acid by at least one carbon atom and by the reaction of vicinal dithiol acids in which the thiol group nearest to the carboxyl group is separated therefrom by at least one carbon atom with aldehydes and ketones.

The reaction of the above-identified carbonyl compounds and dithiols to yield the products of the present invention can be allowed to take place spontaneously at room temperature, or higher temperatures may be employed if it is desired to hasten the reaction. The reactants and catalyst may be mixed together as in Examples I and IV below, or an organic solvent, inert to the reactants, may be used as in Examples II, III, V, VI, and VII.

The following examples in which parts are by weight are illustrative of the invention.

EXAMPLE I

Three hundred parts of ethyl δ-formylvalerate and 180 parts of ethane-1,2-dithiol are mixed with 60 parts of concentrated hydrochloric acid. Anhydrous calcium chloride is added and the mixture allowed to stand for four hours. The product is removed by extraction with ether. The ether solution is washed with water and then with 5% sodium bicarbonate solution, dried, and then subjected to vacuum distillation. The yield is 296 parts (67%) of 2-(4-carbethoxybutyl)-1,3-dithiolane distilling at 126–127° C./0.55 mm., $n_D^{25}$, 1.5164–68.

This ester is hydrolyzed by refluxing it for several hours with a solution of potassium hydroxide in 3:1 water/alcohol. The alcohol is removed by vacuum distillation and the residue acidified with concentrated hydrochloric acid, whereupon 2-(4-carboxybutyl)-1,3-dithiolane precipitates. It is recrystallized from cyclohexane, M. P. 51–52° C.

*Analysis.*—Calculated for $C_8H_{14}O_2S_2$: C, 46.57%; H, 6.84%; S, 31.08%. Found: C, 46.37%, 46.74%; H, 6.85%, 6.82%; S, 31.38%, 31.48%.

EXAMPLE II

Two hundred parts of levulinic acid and 162 parts of ethane-1,2-dithiol are mixed in 264 parts benzene. Anhydrous hydrogen chloride is bubbled in for five minutes, anhydrous calcium chloride is added, and the mixture allowed to stand for two hours. The liquid is decanted from the calcium chloride residue, and the benzene is removed by vacuum distillation leaving a solid residue weighing 273 parts. Recrystallization from pentane yields white crystalline 2-(2-carboxyethyl)-2-methyl-1,3-dithiolane, M. P. 56–56.5° C.

*Analysis.*—Calculated for $C_7H_{12}O_2S_2$: C, 43.72%; H, 6.29%; S, 33.34%. Found: C, 43.84%, 43.90%; H, 6.35%, 6.35%; S, 33.71%, 33.75%.

EXAMPLE III

Two hundred parts of δ-acetylvaleric acid and 131 parts of ethane-1,2-dithiol are mixed in 440 parts benzene. The mixture is worked up as in Example II, giving a 90% crude yield and, after recrystallization from pentane, a 72% yield of white crystalline 2-(4-carboxybutyl)-2-methyl-1,3-dithiolane, M. P. 40–40.5° C.

*Analysis.*—Calculated for $C_9H_{16}S_2O_2$: C, 49.06%; H, 7.32%; S, 29.10%. Found: C, 49.11%, 49.25%; H, 7.38%, 7.42%; S, 29.26%, 29.44%.

EXAMPLE IV

Dry hydrogen chloride is passed through a mixture of 500 parts of methyl δ-formylvalerate and 375 parts of propane-1,2-dithiol. Anhydrous calcium chloride is added and the mixture allowed to stand for four hours. The product is removed by extraction with ether. The ether solution is washed first with water and then with 5% sodium bicarbonate solution, dried, and then subjected to vacuum distillation. A yield of 635 parts of 2-(4-carbomethoxybutyl)-4-methyl-1,3-dithiolane boiling at 122–124° C./0.5 mm. is obtained.

This ester is hydrolyzed by refluxing it with a solution of potassium hydroxide in 3:1 water/alcohol. The alcohol is removed by vacuum distillation and the residue acidified with concentrated hydrochloric acid. The oil which forms is removed by extraction with ether, and the ether solution dried. Vacuum distillation gives 529 parts of 2-(4-carboxybutyl)-4-methyl-1,3-dithiolane, B. P. 144° C./0.07 mm., $n_D^{27}$ 1.5340.

*Anaylsis.*—Calculated for $C_9H_{16}O_2S_2$: C, 49.06%; H, 7.32%; S, 29.10%. Found: C, 48.68%, 48.66%; H, 7.20%, 7.37%; S, 30.45%, 30.49%.

EXAMPLE V

Three hundred parts of levulinic acid and 278 parts of propane-1,2-dithiol are mixed in 400 parts of benzene. Anhydrous hydrogen chloride is bubbled in for five minutes, anhydrous calcium chloride is added, and the mixture allowed to stand overnight. The liquid is decanted from the calcium chloride residue, and the benzene removed by vacuum distillation. Distillation of the residue yields 300 parts (57%) of 2-(2-carboxyethyl)-

2,4-dimethyl-1,3-dithiolane boiling at 142.5° C./0.65 mm. The distillate solidifies on cooling to a white crystalline mass, M. P. 43.5–46° C.

EXAMPLE VI

Three hundred parts of methyl δ-formylvalerate and 250 parts of 2,3-dimercaptopropanol-1 are mixed in 2000 parts of benzene. Anhydrous hydrogen chloride is bubbled in for five minutes, anhydrous calcium sulfate is added, and the mixture allowed to stand for two days. After decantation from the solid, the benzene layer is extracted, first with concentrated sodium bisulfite solution, and then with water. The benzene is then removed by vacuum distillation and the residue dried in vacuum for several hours. There is obtained 419 parts of water-white 2-(4-carbomethoxybutyl) - 4 - hydroxymethyl-1,3-dithiolane (80%), $n_D^{26}=1.5352$. Attempted distillation results in decomposition.

EXAMPLE VII

Four hundred parts of ethyl acetoacetate and 290 parts of ethane-1,2-dithiol are mixed in 500 parts of benzene. Anhydrous hydrogen chloride is bubbled in for five minutes, anhydrous calcium sulfate is added, and the mixture allowed to stand overnight. The benzene layer is decanted from the solid residue, and the benzene removed by vacuum distillation. The residue is then distilled. The yield is 532 parts (84%) of 2-carbethoxymethyl-2-methyl-1,3,-dithiolane distilling at 86° C./0.1 mm., $n_D^{25}=1.5213$.

When the process of Example VII is repeated using acetaldehyde and 4,5-dimercaptovaleric acid (prepared according to the method of Evans and Owen, J. Chem. Soc. 1949, 244–8) as the reactants in benzene solution, 4-(2-carboxyethyl)-2-methyl-1,3,-dithiolane is obtained.

In a similar manner, the reaction of 10,11-dimercaptohendecanoic acid (prepared according to the method of Pavlic, U. S. 2,408,094) with isobutyraldehyde in benzene solution yields 4-(8-carboxyoctyl)-2-isopropyl-1,3,-dithiolane.

Other substituted 1,3-dithiolanes of the present invention are prepared in a similar manner from the reactants (a and b) as indicated below.

| Reactants | Substituted dithiolane |
|---|---|
| (a) Ethane-1,2-dithiol<br>(b) β-Oxovaleric acid | 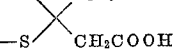<br>2-carboxymethyl-2-ethyl-1,3-dithiolane |
| (a) Butane-1,2-dithiol<br>(b) β-Formylpropionic acid | 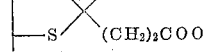<br>2-(2-carboxyethyl)-4-ethyl-1,3-dithiolane |
| (a) Phenylethane-1,2-dithiol<br>(b) δ-Formylvaleric acid | 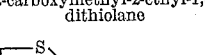<br>2-(4-carboxybutyl)-4-phenyl-1,3-dithiolane |
| (a) Ethane-1,2-dithiol<br>(b) β-Oxo-δ-phenylvaleric acid | 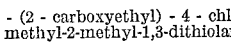<br>2-carboxymethyl-2-(2-phenylethyl)-1,3-dithiolane |
| (a) γ,δ-Dimercaptovaleric acid<br>(b) Acetophenone | 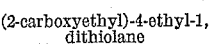<br>4-(2-carboxyethyl)-2-methyl-2-phenyl-1,3-dithiolane |
| (a) Butane-2,3-dithiol<br>(b) δ-Acetylvaleric acid | 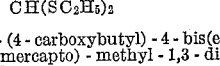<br>2-(4-carboxybutyl)-2,4,5-trimethyl-1,3-dithiolane |
| (a) 2,3-dimethyl-2,3-dithiobutane<br>(b) Levulinic acid | 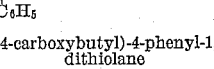<br>2-(2-carboxyethyl)-2,4,4,5,5-pentamethyl-1,3-dithiolane |
| (a) Methyl propyl ketone<br>(b) 10,11-dimercapto-undecanoic acid. | 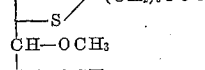<br>4-(8-carboxyoctyl)-2-methyl-2-propyl-1,3-dithiolane |
| (a) Cinnamaldehyde<br>(b) γ,δ-Dimercaptovaleric acid | 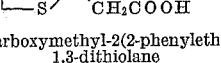<br>4-(2-carboxyethyl)-2-(2-phenylvinyl)-1,3-dithiolane |
| (a) 10,11-dimercapto-undecanoic acid.<br>(b) δ-Formylvaleric acid | 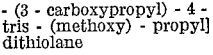<br>2-(4-carboxybutyl)-4-(8-carboxyoctyl)-1,3-dithiolane |
| (a) Ethane-1,2-dithiol<br>(b) γ-Ketopimelic acid | <br>2,2-bis(2-carboxyethyl)-1,3-dithiolane |
| (a) γ,δ-Dimercaptovaleric acid<br>(b) γ-Ketopimelic acid | <br>2,2,4-tris(2-carboxyethyl)-1,3-dithiolane |
| (a) 3-chloropropane-1,2-dithiol<br>(b) Levulinic acid | <br>2-(2-carboxyethyl)-4-chloromethyl-2-methyl-1,3-dithiolane |
| (a) 3,3-bis-(ethylmercapto)propane-1,2-dithiol<br>(b) δ-Formylvaleric acid | <br>2-(4-carboxybutyl)-4-bis(ethylmercapto)-methyl-1,3-dithiolane |
| (a) 3,4,5-trimethoxypentane-1,2-dithiol<br>(b) γ-Formylbutyric acid | <br>2-(3-carboxypropyl)-4-[1,2,3-tris-(methoxy)-propyl]-1-3-dithiolane |
| (a) 3-phenylaminopropane-1,2-dithiol hydrochloride.<br>(b) β-Formylpropionic acid | <br>2-(2-carboxyethyl)-4-phenyl-aminomethyl-1,3-dithiolane hydrochloride |

| Reactants | Substituted dithiolane |
|---|---|
| (a) Ethane-1,2-dithiol. (b) γ-2-(4-carboxy-5-methyl furyl)-acetoacetic acid. | ![structure] S-C(CH₂-furyl-COOH with CH₃)(CH₂COOH)-S<br>2-(carboxymethyl)-2-[2-(4-carboxy-5-methylfuryl]-methyl-1,3-dithiolane |
| (a) Ethane-1,2-dithiol. (b) γ-Chloroacetoacetic acid. | S-C(CH₂Cl)(CH₂COOH)-S<br>2-carboxymethyl-2-chloromethyl-1,3-dithiolane |
| (a) γ,δ-Dimercaptovaleric acid. (b) α-o-Nitrophenylmercapto acetophenone. | S-C(CH₂S-C₆H₄NO₂)(C₆H₅)-S (CH₂)₂COOH<br>4-(2-carboxyethyl)-2-phenyl-2-o-nitrophenylmercaptomethyl-1,3-dithiolane |

The present invention is generic to 1,3-dithiolanes having on dithiolane ring carbon a saturated aliphatic hydrocarbon chain with a carboxyl group on carbon of said hydrocarbon side chain.

The products of the present invention are the 1,3-dithiolanes and substituted 1,3-dithiolanes having on dithiolane ring carbon a carboxylic acid side chain in which the carboxyl group is separated from the ring by a saturated aliphatic hydrocarbon chain of at least one carbon atom. Of these, the 1,3-dithiolanes which apart from ring sulfur and the carboxyl-carrying side chain are hydrocarbon are preferred in biological applications because of their freedom from side reactions due to other functional groups. Of this preferred group of 1,3-dithiolanes, those in which any hydrocarbon substituents number from 0 to 2 are further preferred because of their greater solubility in biological media.

Of the 1,3-dithiolanes and substituted 1,3-dithiolanes having at position 2 or 4 a carboxylic side chain in which the carboxyl group is separated from the ring by a saturated aliphatic hydrocarbon chain of at least one carbon atom, those in which said carboxylic side chain is at position 2 are preferred for practical reasons because the starting materials for their synthesis are more readily available.

The products of the present invention are of use as inhibitors to prevent or retard the rancidification of glyceride fats and oils. For reasons of improved solubility in fats and oils, the compounds of the present invention wherein the carboxyl group is separated from the dithiolane ring carbon by at least two carbons are preferred and for ease of synthesis and availability of starting materials those in which four carbons separate the carboxyl group and the dithiolane ring carbon are especially preferred. The derivatives of the carboxylic acids of the present invention may be used in place of the acids. By derivatives are meant such compounds as the esters, amides, acid anhydrides, etc., which are readily hydrolyzable to the carboxylic acids.

The following illustrates the utilization of the new compounds as inhibitors of rancidification in fats and oils.

A sample of edible cottonseed oil is divided into four portions. Into three of these portions there is mixed, respectively, 1% by weight of three of the compounds of the present invention. The fourth portion is used as a control. All four portions are then incubated in the presence of air at 65° C. and examined daily for the development of rancidity. The results are shown in the following table:

Table

| Cottonseed oil containing— | Days required for rancidity to develop in air at 65° C. |
|---|---|
| No stabilizer (control) | 9. |
| 1% 2-(4-carboxybutyl)-1,3-dithiolane (product of Example I above) | 15. |
| 1% 2-methyl-2-(2-carboxyethyl)-1,3-dithiolane (product of Example II above) | >36 (test terminated). |
| 1% 4-methyl-2-(4-carboxybutyl)-1,3-dithiolane (product of Example IV above) | 15. |

The products of the present invention are useful as fungicides. This may be illustrated by the results of greenhouse tests with tomato plants by the method described by McCallan and Wellman (Crop Protection Digest, Bulletin 68, July 1943, pages 93–134). In this test representative compounds of the present invention show the following results against tomato early blight (*Alternaria solani*).

| Product of Example | Name of compound | Percent disease[1] at— | | Plant injury |
|---|---|---|---|---|
| | | 0.2% | 0.04% | |
| I | 2-(4-carboxybutyl)-1,3-dithiolane | 6 | 26 | None. |
| II | 2-(2-carboxyethyl)-2-methyl-1,3-dithiolane | 0 | 0 | None. |
| III | 2-(4-carboxybutyl)-2-methyl-1,3-dithiolane | 4 | 8 | None. |
| IV | 2-(4-carboxybutyl)-4-methyl-1,3-dithiolane | 2 | 10 | None. |

[1] Compared to an untreated control plant with identical exposure to early blight.

In formulations of compounds of the present invention for use as fungicidal compositions, the preferred are high concentration wettable powders prepared by blending the dry ingredients and grinding in a micropulverizer. A typical formulation included by way of example is as follows:

|  | Percent |
|---|---|
| Active compound, e. g., 1-3-dithiolane-2-valeric acid | 75 |
| China clay (diluent) | 23 |
| Sodium salt of alkyl aryl sulfonate (wetting agent) | 1 |
| Sodium lignin sulfonate (dispersing agent) | 1 |

The formulation is dispersed in water at about 2 lbs./100 gal.

In preparing the substituted 1,3-dithiolanes of the invention for use as fungicides, the materials are formulated according to conventional practices to provide a dust or a water dispersible powder or an emulsifiable oil or some such other form as is suitable in the usual applicator equipment. For this purpose, the substituted 1,3-dithiolane is admixed with a dust, a wetting, dispersing, or emulsifying agent, or a solvent or a combination of these materials, such added ingredients being commonly termed "pest control adjuvants" or "conditioning agents."

Dust compositions of the invention are prepared, for example, by mixing the active substituted 1,3-dithiolane with a finely divided solid such as talc, pyrophyllite, natural clays, diatomaceous earths, and other powdered diluents such as those set out in U. S. Patent 2,426,417.

A wide variety of wetting, dispersing, and emulsifying agents can be employed in preparing water dispersible dusts, or emulsifiable oils of the invention. Such surface active materials are set out in detail in Bulletin E–607 of the Bureau of Entomology and Plant Quarantine of the United States Department of Agriculture and also in an article by McCutchcheon, Chemical Industries, November 1947, page 811, entitled "Snythetic Detergents."

The benefits of the fungicidal properties of the substituted 1,3-dithiolanes of the invention are realized by applying the dithiolanes to organic matter subject to fungus attack. For example, in the control of fungus infections of agricultural crops or ornamental plants, a fungicidal composition of the invention is applied either as a spray or as a dust to the vegetation to be protected. The compositions of the invention can include other fungicidally active materials, insecticides and the like, as is usual in pest control compositions.

The products of the present invention are also highly useful as seed disinfectants and protectants for treatment of corn, peanuts, sorghum, rice, soybeans, peas, beans, melons, and other vegetable crop seeds to control disease, reduce seed rot, and check damping-off of seedlings.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A 1,3-dithiolane having a carboxyl group joined, through an extranuclear saturated aliphatic hydrocarbon chain of at least one carbon, to carbon of the dithiolane nucleus.

2. A 1,3-dithiolane, hydrocarbon except for carboxyl oxygen and dithiolane ring sulfur, and having a carboxyl group joined, through an extranuclear saturated aliphatic hydrocarbon chain of at least one carbon, to carbon of the dithiolane nucleus.

3. A 1,3-dithiolane having a carboxyl group joined, through an extranuclear polymethylene chain of at least two carbons, to carbon of the ditholane nucleus.

4. A 1,3-dithiolane, hydrocarbon except for carboxyl oxygen, and dithiolane sulfur, and having a carboxyl group joined, through an extranuclear polymethylene chain of at least two carbons, to carbon of the dithiolane nucleus.

5. A 1,3-dithiolane having a carboxyl group joined through an extranuclear tetramethylene chain to carbon of the dithiolane nucleus.

6. A 1,3-dithiolane, hydrocarbon except for carboxyl oxygen, and dithiolane sulfur, and having a carboxyl group joined, through an extranuclear tetramethylene chain to carbon of the dithiolane nucleus.

7. 2-(4-carboxybutyl)-1,3-dithiolane.

8. A fatty glyceride of improved resistance to rancidification having incorporated therein an effective small amount of an acid according to claim 2.

9. A fat or oil subject to rancidification but stabilized thereagainst by incorporation therein of a minor but effective amount of an acid according to claim 4.

10. A method for stabilizing animal and vegetable fats and oils against rancidity which comprises incorporating therein a small but effective amount of an acid according to claim 2.

11. A composition adapted for application as a fungicide comprising, in admixture with a pest control adjuvant, an acid according to claim 2.

12. A fatty glyceride of improved resistance to rancidification having incorporated therein an effective amount of a compound according to claim 1.

13. A composition adapted for application as a fungicide comprising, in admixture with a pest control adjuvant, an acid according to claim 1.

14. A composition adapted for application as a fungicide comprising, in admixture with a pest control adjuvant, an acid according to claim 4.

15. A member of the class consisting of the acids of claim 1 and lower alkyl esters thereof.

16. A process for the control of fungi comprising applying to organic matter subject to fungus attack a 1,3-dithiolane having a carboxyl group joined through an extranuclear saturated aliphatic hydrocarbon chain of at least one carbon, to carbon of the dithiolane nucleus.

17. A process for the control of fungi comprising applying to organic matter subject to fungus attack, a 1,3-dithiolane, hydrocarbon except for carboxyl oxygen and dithiolane ring sulfur, and having a carboxyl group joined through an extranuclear saturated aliphatic hydrocarbon chain of at least one carbon, to carbon of the dithiolane nucleus.

References Cited in the file of this patent

UNITED STATES PATENTS

| | | |
|---|---|---|
| 2,493,071 | Kendall et al. | Jan. 3, 1950 |
| 2,690,988 | Jones et al. | Oct. 5, 1954 |
| 2,694,066 | Reed | Nov. 9, 1954 |
| 2,706,158 | Searle | Apr. 12, 1955 |
| 2,752,249 | Latham | June 26, 1956 |
| 2,794,049 | Thompson | May 28, 1957 |
| 2,794,050 | Thompson | May 28, 1957 |

OTHER REFERENCES

J. A. C. A. (I), vol. 74, May 5, 1952, pp. 2382–2384.

Hornberger: J. C. A. S. (2), vol. 75, March 1953, pp. 1273–1277.

Chivers et al.: J. Chem. Soc., 1928, pp. 697–702.

UNITED STATES PATENT OFFICE

CERTIFICATE OF CORRECTION

Patent No. 2,839,445　　　　　　　　　　　　　　　　　　　　June 17, 1958

John F. Harris, Jr.

It is hereby certified that error appears in the printed specification of the above numbered patent requiring correction and that the said Letters Patent should read as corrected below.

Column 2, line 13, for "31.48%" read -- 31.47% --; column 8, list of references cited, under "UNITED STATES PATENTS", insert the following references:

2,755,288　Bullock ---- July 17, 1956
　　　　2,788,355　Bullock ---- April 9, 1957 same column, line 45, under "OTHER REFERENCES" for "J. A. C. A." read -- J. A. C. S. --; line 46, for "J. C. A. S." read -- J. A. C. S. --; same line 46, for "March 1953" read -- March 20, 1953 --.

Signed and sealed this 9th day of September 1958.

(SEAL)
Attest:

KARL H. AXLINE　　　　　　　　　　　　　　　　　　　ROBERT C. WATSON
Attesting Officer　　　　　　　　　　　　　　　　　Commissioner of Patents